US009785841B2

(12) United States Patent
Davis et al.

(10) Patent No.: US 9,785,841 B2
(45) Date of Patent: Oct. 10, 2017

(54) METHOD AND SYSTEM FOR AUDIO-VIDEO SIGNAL PROCESSING

(71) Applicant: Digimarc Corporation, Beaverton, OR (US)

(72) Inventors: Bruce L. Davis, Lake Oswego, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/930,298

(22) Filed: Nov. 2, 2015

(65) Prior Publication Data
US 2016/0188979 A1 Jun. 30, 2016

Related U.S. Application Data

(62) Division of application No. 12/048,072, filed on Mar. 13, 2008, now Pat. No. 9,179,200.
(Continued)

(51) Int. Cl.
| | |
|---|---|
| *G06F 21/00* | (2013.01) |
| *G06K 9/00* | (2006.01) |
| *G06Q 10/06* | (2012.01) |
| *G06Q 30/06* | (2012.01) |
| *H04N 21/8352* | (2011.01) |
| *H04N 21/8355* | (2011.01) |
| *H04N 21/8358* | (2011.01) |
| *H04N 21/8405* | (2011.01) |

(Continued)

(52) U.S. Cl.
CPC ......... *G06K 9/00744* (2013.01); *G06Q 10/06* (2013.01); *G06Q 30/06* (2013.01); *H04L 63/10* (2013.01); *H04N 21/2353* (2013.01); *H04N 21/26606* (2013.01); *H04N 21/8352* (2013.01); *H04N 21/8355* (2013.01); *H04N 21/8358* (2013.01); *H04N 21/8405* (2013.01)

(58) Field of Classification Search
None
See application file for complete search history.

(56) References Cited

U.S. PATENT DOCUMENTS

| | | | |
|---|---|---|---|
| 5,210,820 | A | 5/1993 | Kenyon |
| 5,634,012 | A | 5/1997 | Stefik |

(Continued)

FOREIGN PATENT DOCUMENTS

| | | | | |
|---|---|---|---|---|
| JP | 2010187419 A | * | 8/2010 | ......... G06Q 20/3821 |
| WO | WO02065782 | | 8/2002 | |

(Continued)

OTHER PUBLICATIONS

Campbell et al. Detection Systems for Digital Documents. IEEE 2000. Retrieved online May 31, 2017. file:///a/Users/jreagan/Documents/e-Red%20Folder/14930298/NPL.pdf.*

(Continued)

*Primary Examiner* — James A Reagan
(74) *Attorney, Agent, or Firm* — Digimarc Corporation

(57) ABSTRACT

Both fingerprinting and watermark decoding processes are applied to received items of audio-visual content. Further processing is applied as well. This further processing depends on output data from the watermark decoding process, and can cause two items of seemingly-identical audio-visual content to be further-processed in different ways.

5 Claims, 5 Drawing Sheets

Related U.S. Application Data

(60) Provisional application No. 60/894,859, filed on Mar. 14, 2007.

(51) Int. Cl.
*H04L 29/06* (2006.01)
*H04N 21/235* (2011.01)
*H04N 21/266* (2011.01)

(56) References Cited

U.S. PATENT DOCUMENTS

| | | | |
|---|---|---|---|
| 5,715,403 | A | 2/1998 | Stefik |
| 6,505,160 | B1 | 1/2003 | Levy et al. |
| 6,647,548 | B1 | 11/2003 | Lu |
| 6,684,254 | B1 | 1/2004 | Dutta |
| 6,829,368 | B2 | 12/2004 | Meyer et al. |
| 6,990,453 | B2 | 1/2006 | Wang et al. |
| 7,003,131 | B2 | 2/2006 | Watson |
| 7,043,473 | B1 | 5/2006 | Rassool |
| 7,047,241 | B1 | 5/2006 | Erickson |
| 7,113,615 | B2 | 9/2006 | Rhoads |
| 7,117,513 | B2 | 10/2006 | Nelson |
| 7,185,201 | B2 | 2/2007 | Rhoads |
| 7,194,490 | B2 | 3/2007 | Zee |
| 7,284,255 | B1 | 10/2007 | Apel et al. |
| 7,298,864 | B2 | 11/2007 | Jones |
| 7,302,574 | B2 | 11/2007 | Conwell |
| 7,363,278 | B2 | 4/2008 | Schmelzer |
| 7,369,677 | B2 | 5/2008 | Petrovic et al. |
| 7,421,723 | B2 | 9/2008 | Harkness |
| 7,681,032 | B2 | 3/2010 | Peled et al. |
| 7,703,140 | B2 | 4/2010 | Nath et al. |
| 7,707,427 | B1 | 4/2010 | Kenrich et al. |
| 7,757,075 | B2 | 7/2010 | DeTreville |
| 7,783,489 | B2 | 8/2010 | Kenyon et al. |
| 7,831,531 | B1 | 11/2010 | Baluja et al. |
| 7,870,574 | B2 | 1/2011 | Kenyon et al. |
| 8,490,206 | B1 | 7/2013 | Fish |
| 2002/0028000 | A1 | 3/2002 | Conwell |
| 2002/0048369 | A1* | 4/2002 | Ginter ............... G06F 21/10 380/277 |
| 2002/0052849 | A1 | 5/2002 | McCutchen et al. |
| 2002/0052885 | A1 | 5/2002 | Levy |
| 2002/0077986 | A1 | 6/2002 | Kobata et al. |
| 2002/0168082 | A1* | 11/2002 | Razdan ............... G06F 21/10 382/100 |
| 2003/0021441 | A1 | 1/2003 | Levy |
| 2003/0037010 | A1 | 2/2003 | Schmelzer |
| 2003/0061490 | A1 | 3/2003 | Abajian |
| 2004/0022444 | A1 | 2/2004 | Rhoads |
| 2004/0044571 | A1 | 3/2004 | Bronnimann et al. |
| 2004/0054661 | A1 | 3/2004 | Cheung |
| 2004/0107166 | A1* | 6/2004 | Stefik ............... G06F 21/10 705/51 |
| 2004/0163106 | A1 | 8/2004 | Schrempp et al. |
| 2004/0225645 | A1 | 11/2004 | Rowney |
| 2004/0243567 | A1 | 12/2004 | Levy |
| 2005/0043960 | A1 | 2/2005 | Blankley |
| 2005/0105726 | A1 | 5/2005 | Neubauer |
| 2005/0125358 | A1 | 6/2005 | Levin |
| 2005/0141707 | A1 | 6/2005 | Haitsma |
| 2005/0193408 | A1 | 9/2005 | Sull et al. |
| 2005/0259819 | A1 | 11/2005 | Oomen |
| 2005/0273612 | A1 | 12/2005 | Van Der Veen et al. |
| 2005/0273617 | A1 | 12/2005 | Mihcak et al. |
| 2006/0034177 | A1 | 2/2006 | Schrempp |
| 2006/0075237 | A1 | 4/2006 | Seo |
| 2006/0112015 | A1 | 5/2006 | Chancellor et al. |
| 2006/0115108 | A1 | 6/2006 | Rodriguez |
| 2006/0171474 | A1 | 8/2006 | Ramaswamy |
| 2006/0174348 | A1 | 8/2006 | Rhoads |
| 2006/0240862 | A1 | 10/2006 | Neven |
| 2006/0287916 | A1 | 12/2006 | Starr et al. |
| 2007/0005417 | A1 | 1/2007 | Desikan et al. |
| 2007/0038567 | A1 | 2/2007 | Allaire et al. |
| 2007/0055500 | A1* | 3/2007 | Bilobrov ........... G06F 17/30743 704/217 |
| 2007/0098172 | A1 | 5/2007 | Levy et al. |
| 2007/0110010 | A1 | 5/2007 | Kotola et al. |
| 2007/0130015 | A1 | 6/2007 | Star et al. |
| 2007/0130177 | A1 | 6/2007 | Schneider |
| 2007/0130580 | A1 | 6/2007 | Covell et al. |
| 2007/0162761 | A1 | 7/2007 | Davis |
| 2007/0175998 | A1 | 8/2007 | Lev |
| 2007/0192352 | A1 | 8/2007 | Levy |
| 2007/0203911 | A1 | 8/2007 | Chiu |
| 2007/0208711 | A1 | 9/2007 | Rhoads |
| 2007/0220575 | A1 | 9/2007 | Cooper |
| 2007/0234213 | A1 | 10/2007 | Krikorian |
| 2007/0242880 | A1 | 10/2007 | Stebbings |
| 2007/0253594 | A1 | 11/2007 | Lu et al. |
| 2007/0260671 | A1 | 11/2007 | Harinstein et al. |
| 2007/0294173 | A1 | 12/2007 | Levy et al. |
| 2008/0002854 | A1 | 1/2008 | Tehranchi et al. |
| 2008/0005241 | A1 | 1/2008 | Cohen |
| 2008/0027931 | A1 | 1/2008 | Lu |
| 2008/0034396 | A1 | 2/2008 | Lev |
| 2008/0051029 | A1 | 2/2008 | Witteman |
| 2008/0059211 | A1 | 3/2008 | Brock et al. |
| 2008/0059536 | A1 | 3/2008 | Brock |
| 2008/0109306 | A1 | 5/2008 | Maigret et al. |
| 2008/0109369 | A1 | 5/2008 | Su |
| 2008/0154401 | A1 | 6/2008 | Wang |
| 2008/0155701 | A1 | 6/2008 | Martinez et al. |
| 2008/0162228 | A1 | 7/2008 | Mechbach |
| 2008/0165960 | A1 | 7/2008 | Woo |
| 2008/0178302 | A1* | 7/2008 | Brock ............... G06F 17/30864 726/32 |
| 2008/0209502 | A1 | 8/2008 | Seidel |
| 2008/0235200 | A1 | 9/2008 | Washington |
| 2008/0240490 | A1 | 10/2008 | Finkelstein |
| 2008/0249961 | A1 | 10/2008 | Harkness |
| 2008/0275763 | A1 | 11/2008 | Tran et al. |
| 2009/0006225 | A1 | 1/2009 | Multerer |
| 2009/0052784 | A1 | 2/2009 | Covell et al. |
| 2009/0063279 | A1 | 3/2009 | Ives |
| 2009/0083228 | A1 | 3/2009 | Shatz et al. |
| 2009/0119169 | A1 | 5/2009 | Chandratillake |
| 2009/0129755 | A1 | 5/2009 | Rakib |
| 2009/0144325 | A1 | 6/2009 | Chastagnol |
| 2009/0144772 | A1 | 6/2009 | Fink |
| 2009/0165031 | A1 | 6/2009 | Li |

FOREIGN PATENT DOCUMENTS

| | | |
|---|---|---|
| WO | WO2009100093 | 8/2009 |
| WO | WO2009017049 | 9/2009 |

OTHER PUBLICATIONS

U.S. Appl. No. 60/975,158, filed Sep. 25, 2007 (and a priority application for US20080109369 to Google).
U.S. Appl. No. 60/856,501, filed Nov. 3, 2006 (and a priority application for US20080109369 to Google).
U.S. Appl. No. 61/026,444, filed Feb. 5, 2008 (and a priority application for WO09100093, and U.S. Appl. No. 12/865,807, to Dolby Laboratories).
Haitsma, et al, "A Highly Robust Audio Fingerprinting System," Proc. Intl Conf on Music Information Retrieval, 2002.
Cano et al, "A Review of Audio Fingerprinting," Journal of VLSI Signal Processing, 41, 271, 272, 2005.
Kalker et al, "Robust Identification of Audio Using Watermarking and Fingerprinting," in Multimedia Security Handbook, CRC Press, 2005.
Patent Office file re U.S. Appl. No. 60/870,817 by Meckbach, Method and Device for the Production of Advertising, filed Dec. 19, 2006 (provisional priority case for US20080162228 to Trivid).
Patent Office file re U.S. Appl. No. 60/891,764 by Weidel, Associating Rights to Multimedia Content, filed Feb. 27, 2007 (provisional priority case for US20080209502 to Motion Picture Laboratories).

(56) References Cited

OTHER PUBLICATIONS

Patent Office file re U.S. Appl. No. 60/910,717 by Harkness, Digital Rights Management and Audience Measurement Systems and Methods, filed Apr. 9, 2007 (provisional priority case for US20080249961 to Nielsen).

Patent Office file re U.S. Appl. No. 60/914,168 by Harkness, Hardware and Software Architecture to Protect Against Unauthorized Copyrighted Content, filed Apr. 26, 2007 (provisional priority case for US20080249661 to Nielsen).

Patent Office file re U.S. Appl. No. 60/919,466 by Harkness, Digital Rights Management and Audience Measurement Systems and Methods, filed Mar. 22, 2007 (provisional priority case for US20080249961).

Patent Office file re U.S. Appl. No. 60/939,527 by Harkness, Digital Rights Management and Audience Measurement Systems and Methods, filed May 22, 2007 (provisional priority case for US20080249961 to Nielsen).

Patent Office file re U.S. Appl. No. 60/957,446 by Covell, Fast and Accurate Detection and Classification of Matches Between Time-Based Media, filed Aug. 22, 2007 (provisional priority case for US20090052784 to Google).

Patent Office file re U.S. Appl. No. 60/968,725 by Ives, Contextual Ads for Video, filed Aug. 29, 2007 (provisional priority case for US20090063279 to TVEyes).

Patent Office file re U.S. Appl. No. 61/029,155 by Ramaswamy, Method and Apparatus to Control the Transmission of Media Content, filed Feb. 15, 2008 (provisional priority case for US20080249961 to Nielsen).

Global File Registry, Technical White Paper, Draft 1-26, May 2006.

Manber, Finding Similar Files in a Large File System, Department of Computer Science, the University of Arizona, Tucson Arizona, Oct. 1993.

U.S. Appl. No. 60/927,940, filed May 3, 2007, which serves as priority application for 20080275763 to Google.

Prosecution excerpts from U.S. Appl. No. 13/686,541, filed Nov. 27, 2012, including applicant submissions dated Nov. 27, 2012, Apr. 10, 2013, Dec. 3, 2013, and Feb. 3, 2015, and Office documents dated Apr. 9, 2013, Sep. 3, 2013 and Jan. 3, 2014.

\* cited by examiner

METHOD AND SYSTEM FOR AUDIO-VIDEO SIGNAL PROCESSING

RELATED APPLICATION DATA

This application is a division of application Ser. No. 12/048,072, filed Mar. 13, 2008 (now U.S. Pat. No. 9,179,200), which claims priority benefit from provisional application 60/894,859, filed Mar. 14, 2007.

BACKGROUND AND SUMMARY

Web site operators sometimes receive DMCA "take down" notices from media companies, alleging that content hosted on their web sites is copyrighted and should not be distributed. There is a growing need for automated tools to help web site operators pro-actively identify such content and treat it in a manner that might avoid the need for take-down notices. This need perhaps is felt most acutely by so-called "social networking" sites, to which individual users upload audio, video and picture files—content that is sometimes original, and sometimes not (and sometimes a combination).

Various techniques can be employed to automatically identify copyrighted content. One is to examine content data for a digital watermark embedded by the content owner to signal that the content is copyrighted and should not be reproduced. Such techniques are detailed, for example, in commonly-owned application Ser. No. 09/620,019, filed Jul. 20, 2000 (now U.S. Pat. No. 7,689,532), and patent publication US20020052885.

Another approach is to try and identify the content by pattern recognition techniques (sometimes termed "fingerprinting" or "robust hashing"). Once the content is identified, a metadata database can be consulted to determine whether distribution of the content should be allowed or prohibited. (Such techniques are detailed, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents WO02/065782, US20060075237, US20050259819, US20050141707, and US20020028000.)

Other techniques and systems related to the technology detailed herein are disclosed in patent publications US20080051029, US20080059211, US20080027931, US20070253594, US20070242880, US20070220575, US20070208711, US20070175998, US20070162761, US20060240862, US20040243567, US20030021441, U.S. Pat. Nos. 7,185,201, 7,298,864 and 7,302,574, and in provisional application 61/016,321, filed Dec. 21, 2007.

Part of the difficulty is that some of the content uploaded to web sites may include copyrighted material, yet qualify as "fair use"—such as parody, or commentary/criticism. ("Tolerated use" is a stepchild of fair use, and encompasses arguably infringing uses that are commonly overlooked by rights holders for reasons such as concern about adverse publicity, or out of desire for the exposure that such use affords.) Existing automated techniques do not make provision for "fair use" (nor for "tolerated use"). Instead, known techniques typically flag as objectionable any content that is determined to include any copyrighted material.

Described below is an illustrative arrangement that allows a more nuanced assessment of content data—one that responds differently, depending on context, environmental factors, and/or other circumstances.

DETAILED DESCRIPTION

Figure 1:
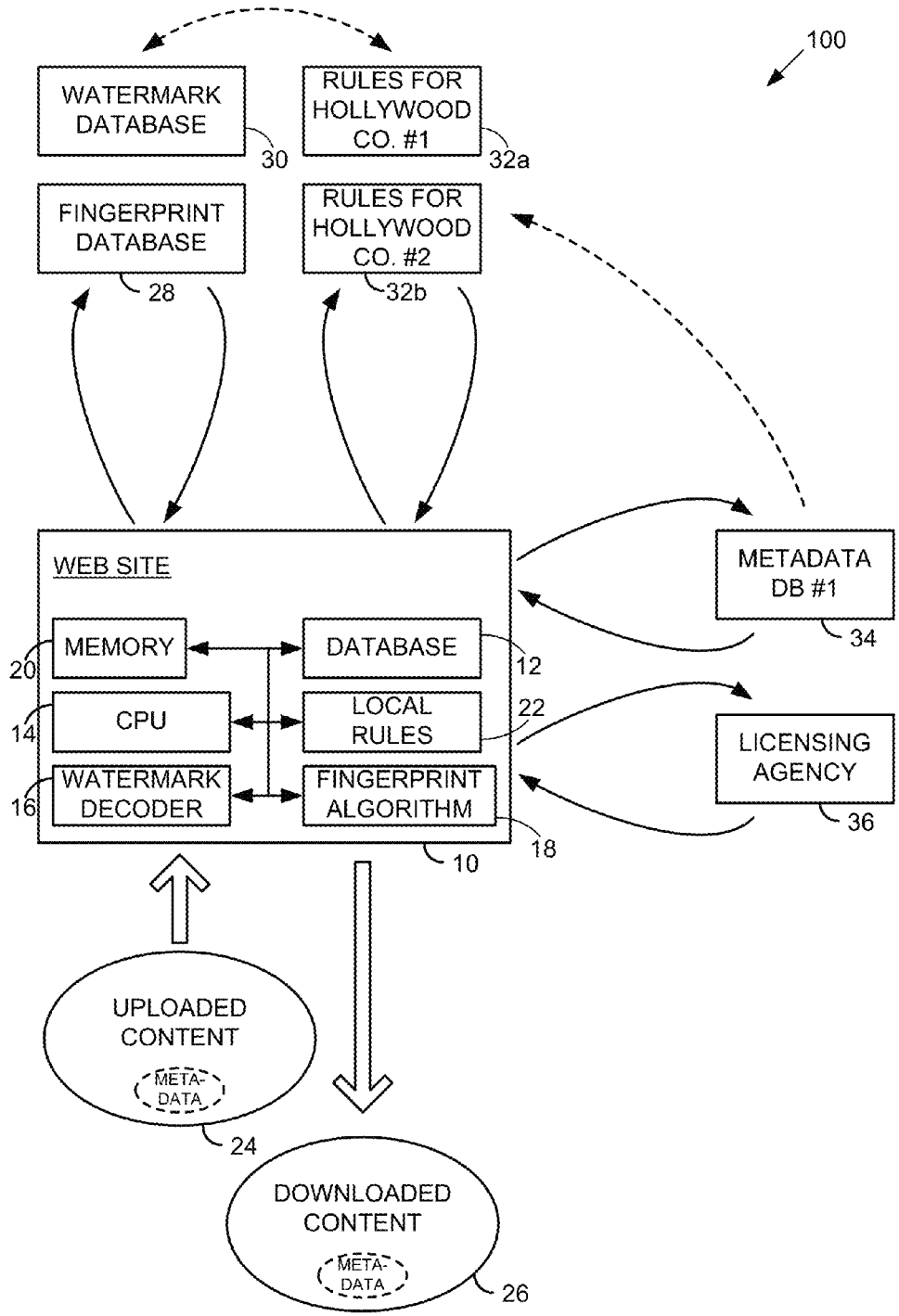
FIG. 1 shows an illustrative system employing some of the technology detailed herein.

Consider an embodiment that examines uploaded content (e.g., a video uploaded to MySpace, or YouTube), to identify portion(s) that have been derived from one or more pre-existing (reference) works. Using a technique such as fingerprinting, or digital watermark decoding, such a process may automatically determine that an uploaded video includes a ten second clip taken from the opening scene of the movie Dirty Harry, showing Clint Eastwood say, "Go ahead, make my day." The video may further include a government archive clip of Ronald Reagan, threatening to veto tax-increase legislation by using the same phrase, as well as a clip from the movie Back to the Future III, where Marty utters the same phrase. The video may also be found to include, as an underlying soundtrack, the entirety of the Eminem's song "Mosh."

Another example (long popular on YouTube) is the "Evolution of Dance" video, which shows Judson Laipply dancing briefly to excerpts of 30 popular songs (parenthetical times are where the song clip appears in the six minute video): "Hound Dog," by Elvis Presley (00.00-00.14); "The Twist," by Chubby Checker (00.14-00.31); "Stayin' Alive," by The Bee Gees (00.31-00.38); "Y.M.C.A.," by The Village People (00.38-00.56); "Kung Fu Fighting," by Carl Douglas (00.56-01.03); "Keep on Groovin'," by The Brady Bunch (01.03-01.17); "Greased Lightnin'," by John Travolta (01.17-01.28); "You Shook Me All Night Long," by AC/DC (01.28-01.42); "Billie Jean," by Michael Jackson (01.42-01.50); "Thriller," by Michael Jackson (01.50-01.58); "Oompa Loompa," by Willy Wonka, a soundtrack of the film: Willy Wonka & the Chocolate Factory (01.58-02.04); "Mr. Roboto," by Styx (02.04-02.14); "Break Dance (Electric Boogie)," by West Street Mob (02.14-02.28); "Walk Like An Egyptian," by The Bangles (02.28-02.36); "The Chicken Dance," by Bob Kames (02.36-02.42); "Mony Mony," by Billy Idol (02.42-02.57); "Ice Ice Baby," by Vanilla Ice (02.57-03.11); "U Can't Touch This," by MC Hammer (03.12-03.42); "Love Shack," by The B-52's (03.42-03.46); "Apache," by The Sugarhill Gang (03.46-04.02); "Jump Around," by House of Pain (04.02-04.15); "Baby Got Back," by Sir Mix-A-Lot (04.15-04.22); "Tubthumping," by Chumbawamba (04.22-04.32); "What Is Love," by Haddaway (04.32-04.40); "Cotton Eyed Joe," by Rednex (04.40-05.01); "Macarena," by Los Del Rio (05.01-05.06); "Bye Bye Bye," by N'Sync (05.06-05.29); "Lose Yourself," by Eminem (05.29-05.33); "Hey Ya!," by Outkast (05.33-05.39); "Dirt Off Your Shoulder," by Jay-Z (05.39-05.49); "Ice Ice Baby," by Vanilla Ice (Lyrics played: "Yo, let's get outta here. Word to your mother".) (05.49-05.52); "Bye Bye Bye," by N'Sync (Lyrics played: "Bye, bye, bye".) (05.52-06.00).

Video "mash-ups" such as these are increasingly common among user-generated content posted to social networking websites.

How should a web site handle such content? Should it allow or forbid free distribution? Should it allow distribution with conditions, such as with some recompense to relevant copyright holders? Etc.

An exemplary embodiment of the present technology considers a plurality of factors and/or parameters in making an automated decision. Such considerations can include (by way of example and not limitation):

1. The length of the derived portion. The length can be, e.g., in absolute terms (e.g., 10 seconds), or in percentage of the pre-existing work (e.g., 10 seconds may comprise 20% of a 50 second video, or a tiny fraction of a two hour movie). Different procedures may be invoked, depending on the length. For example, if the entirety of a pre-existing work is used, then free distribution may be prohibited (and a notice may be electronically sent to the submitter explaining same), or the system may permit free distribution but share 75% of associated ad revenue with the copyright holder of the work. If two seconds or less is used, the system may permit free distribution. If between two and five seconds is used, the system may permit free distribution, but send a notice to the copyright holder alerting it to the use, and periodically alert the copyright holder to the content's popularity ranking on the site. If from five to ten seconds is used, and such portion comprises less than 10% of the entirety of a copyrighted work, the system may proceed as just-stated, with 10% of associated ad revenue shared with the copyright holder—unless copyright in the work is held by Company A, in which case no distribution is permitted (and a notification is sent to the submitter). If between ten and fifteen seconds is used, the system may proceed as just-stated but with a 15% ad revenue share, unless copyright in the work is held by one of several specified Japanese rights-holders, in which case no distribution is permitted. Etc. Etc.

2. The part of the pre-existing content from which the portion is derived. For example, if the portion is taken from the first or last ten seconds, or from the first or last one percent of the content—whichever is smaller, any applicable ad-revenue share otherwise determined to be applicable may be increased by 25%. If the portion is taken from the chorus or title phrase of a song, any applicable ad-revenue share otherwise determined to be applicable may be increased by 33%.

3. An identity of a party having rights to the pre-existing work. If the portion is determined to have been authored by an agency of the US government (e.g., a government movie clip of President Reagan), then the system may determine that no restriction should arise by use of such clip—regardless of its length. If the portion is determined to have been derived from a copyrighted work owned by Company B, then the system may notify the Company if the content is sufficiently popular that it ranks among the 100 top videos downloaded from the site for any given day or week. If the portion is determined to have been derived from a copyrighted work owned by Company C, then the system may edit the content to remove that portion—if less than 5 seconds in length (possibly substituting a screen saying "Video omitted at request of Company C," or another message established by Company C or the web site, if the copyrighted work is visual), or, if longer, prohibit distribution of the content. If the portion is a video clip determined to depict Individual D, who may enjoy a protectable right of publicity, then a notice may be dispatched to a last-known contact address for that person, and 10% of any associated ad revenue may be deposited into a reserve account to help fund possible claims against the web site operator. If watermark- or fingerprint-indexed metadata permits identification of actors depicted in a video clip, contract terms between the web site and the Screen Actors' Guild may specify, e.g., that each actor is entitled to 0.25 cents each time the content is downloaded. If the portion includes music in the licensing catalog of the Harry Fox agency, or ASCAP/BMI, a royalty payment of 0.1 cents for each ten seconds of music, up to a maximum of 0.4 cents, may be accrued for payment each time the content is downloaded.

4. An identity of another party affiliated with the pre-existing work. Sometimes parties in addition to rights-holders may be considered in determining treatment of content. One such party is the person from whom the content is uploaded. Other potentially relevant parties include those in the chain of content distribution that led to the content finally being uploaded to the web site. (Such chain may be determined, e.g., by watermark data added by various parties involved in the content's distribution.) Ten percent of associated ad revenue may be provided to the person who uploaded the content, and a further five percent may be distributed among earlier parties in the chain of distribution.

5. A language of the pre-existing work, or other language (s) found in the content. Metadata can be consulted to determine the language of the portion, or same can be determined by machine recognition techniques. If the portion is in Japanese, and the content is downloaded to a user in the United States, any sharing of ad revenue otherwise owing may be reduced by 50%. If a Japanese language clip is included in a video mash-up that includes no other Japanese language content (e.g., the rest of the mash-up comprises Spanish or English language content), then any sharing of ad revenue otherwise owing may be increased by 25%.

6. A country of origin of the pre-existing work. If the portion is determined to have been copied from a television sitcom produced in the European Union, a copyright levy may be paid to the royalty collecting society in the work's country of origin. The amount of this levy can be fixed (e.g., a penny per download), or it can be a share of advertising revenue (with different share percentages for content downloaded into different countries). These amounts can naturally also depend on others of these listed factors.

7. Metadata conveyed with the portion, e.g., by watermark data, header data, etc. Such metadata may specify, for example, that unlimited distribution is permitted, provided written attribution is provided to a specified rights-holder. In such case, the system can overlay a text legend on the video portion saying "Video used courtesy of Party E." Such overlay can be accomplished on-the-fly, each time the content is downloaded. Or the content can be edited once to conform to the specified requirement, and stored in this edited fashion. The metadata may also specify terms of use with which the system can comply, e.g., this content can be used only if advertising is suppressed while the content is rendered. The metadata can also specify the amount and payee of required royalty payments. The system can make an automated assessment of such terms, and act accordingly. For example, the system may apply a threshold cost limit (e.g., 1.5 cents) and permit redistribution of the content only if the required royalty payment is beneath this threshold. The system may further take other factors into account. For example, if the portion is recognized to be from one of several items of content that are known to be popular on the site (e.g., historical download data may show that all clips from The Daily Show by Jon Stewart fall into this category), it can triple the threshold cost limit otherwise applied.

8. Metadata conveyed apart from the portion, e.g., in a database at the web site or at a remote location. While metadata can be literally conveyed with content as noted above, it is often stored separately from the content, and indexed by an identifier derived from the content. The identifier may be derived by fingerprint technology (including, e.g., pattern matching), or by watermark decoding. The metadata may be stored in a database maintained by a party having rights to the content, or by a third party—including the web site operator. For example, a fingerprint-based identifier derived from content may serve as a pointer to a database record maintained by Hollywood content producer A. The web site may copy that metadata and mirror it in a database kept locally with the site's web server. Digimarc operates commercial metadata services, ImageBridge and MyPictureMarc, which, when queried by watermark-decoded content identifiers, return associated metadata. Another metadata service is detailed in patent application Ser. No. 11/614,947 (now published as US20070208711). Other providers, such as Flickr, del.icio.us, and Google Video, likewise serve as metadata repositories for content. In addition to the use cases just-given (in connection with metadata conveyed with the portion), such metadata repositories can provide data relating to many of the other factors noted herein (e.g., identification of rights holders, language, terms of use, etc.).

(The metadata (e.g., from Flickr) may associate a Creative Commons license with the work. There are six main types of Creative Commons licenses. The most restrictive (while still allowing redistribution) is "Attribution Non-commercial No Derivatives," which permits others to share the work—unchanged and non-commercially, provided the user gives the creator credit and a link-back. Next is "Attribution Non-commercial Share Alike," which allows others to make derivative works non-commercially, provided they credit the creator, and such works licensed under the same terms. The "Attribution Non-commercial" license is similar, but without the requirement that derivative works be licensed on the same terms. "Attribution Share Alike" is similar, but allowing commercial uses (and requiring licensing on the same basis). "Attribution No Derivatives," forbids making derivative works, but allows redistribution in original form, with credit to the creator. Least restrictive is "Attribution (by)," which allows others to make derivative works and use commercially, as long as they credit the creator. Other, more specialized, licenses are also available, e.g., "Sampling Licenses" for re-use of snippets, "Public Domain Dedication" to free works from all copyright protection, "Music Sharing Licenses" for fan use, "Developing Nations License" with less restrictive terms in low income countries, etc. Each of these licenses has abbreviated descriptors, such as "by-nc" for the "Attribution Non-commercial" license. These and other terms-of-use type metadata can be used to govern automatically the manner in which content is treated by a web site.)

9. A popularity metric associated with the pre-existing work (or the uploaded content). A clip from a Beatles song will often warrant a different treatment than a clip from an undiscovered garage band. Popularity of a pre-existing work can be determined in numerous ways. One is by reference to industry "Top" lists, such as those published by Billboard magazine (and available on the Billboard web site), etc. Another is by reference to popularity indices maintained by content vendors such as Amazon (the Amazon Sales Rank) and Apple/iTunes. Once content is identified, the system can assess its popularity by reference to one or more such data sources. If the popularity of the work exceeds a threshold (e.g., a ranking in the top 100 of any of Billboard's lists, or an Amazon Sales Rank of 500 or above), then treatment of such a portion can be different than that afforded portions derived from less popular works. For example, a fee may be charged to users who download the content. Or a portion of ad-related revenue may be provided to the copyright holder(s) of the constituent portions, or added to a reserve account to fund possible claims.

Similarly, the uploaded content's own popularity may influence its manner of treatment. For example, once a video breaks into YouTube's 100 Most Viewed videos of the day or week, it may merit different treatment than video that is rarely viewed. As noted in the preceding paragraph, a fee may be charged, or a portion of ad-related revenue may be earmarked. In one embodiment, the acts detailed herein are not invoked routinely, but are invoked only when the content breaks into a top echelon of popularity.

10. A jurisdiction from which the web site is hosted, or from which the content was uploaded, or to which the content is to be distributed. A different per-download fee may be warranted if content is downloaded to Canada than Cuba. Similarly, different treatment may be appropriate based on the location from which the content originated, or even the physical location of the web site servers.

11. A value associated with the pre-existing work. Sometimes values can be associated with pre-existing works, e.g., by reference to the price of the work as distributed in CD/DVD form by Amazon. Beatles music is rarely discounted; grade B movies are often discounted. From such information, better-informed business decisions may be made about treatment of content.

12. Historical information concerning related content. Sometimes a relationship can be inferred, or established, between uploaded content and content earlier handled by the web site. A new episode of The Daily Show by Jon Stewart may be recognized, by metadata association, to be related to earlier episodes. Information about the earlier episodes (e.g., how it was treated by the website; consumption data; etc.) can be retrieved and used to inform how the new episode should best be handled.

13. Data relating to an assessment of said content provided by a human evaluator. Sometimes part or all of the content may be referred to a human evaluator for assessment. The evaluator may, e.g., determine whether a pre-existing work identified by fingerprinting is a true match, or a false negative. The evaluator may also classify the content by genre, e.g., home video, amateur music video to commercial sound track, etc. In some cases, this assessment can be referred out to non-employees of the web site, e.g., by using crowdsourcing techniques like Amazon's Mechanical Turk service. (Such arrangements are detailed, e.g., in application US20070162761.) Such techniques can be employed to determine whether use of a pre-existing work has indicia of fair use (considering factors such as the purpose and character of the use, the nature of the copyrighted work, the amount and substantiality of the portion copied, and the effect of the use upon the potential market).

14. Factors, like those above, relating to one or more other portions of the content, which have been derived from other pre-existing works. Content that borrows from dozens of pre-existing works (like the "Evolution of Dance" video noted above) may call for different treatment than content that is based on just a single pre-existing work. For example, any split of ad revenue will need to take into account the relatively large number of others works involved. If such a mash-up borrows exclusively from the catalog of one rights-holder, it might be regarded as helpful publicity for that catalog and therefor be entitled to move favorable usage terms than a mash-up that borrows from a variety of different catalogs.

It is expressly contemplated that systems incorporating the presently-described technology may employ rules that are dependent on more than one of the factors noted above. In some cases, some factors may be dependent on others. All such permutations and combinations are expressly encompassed by this specification.

The analysis of the content—and sometimes circumstance and context—to determine treatment can be undertaken by the web site system at the time content is uploaded to the site (e.g., at "ingest"). The system can seek to examine the uploaded content to try and identify all possible pre-existing works from which portions may have been derived, or it may only check against a limited number of pre-existing works (e.g., those works owned by predetermined parties). Alternatively, instead of performing these acts at ingest, the system can undertake these actions at a later time (e.g., after the content has demonstrated some user popularity—such as being downloaded 100 or 1000 times; or in response to a third party request—such as by a rights holder who notices an excerpt of copyrighted content hosted by the site). Certain of these acts can also be undertaken not by the web site operator, but by third parties (e.g., content owners), such as by automated web scripts that download content of interest, and assess same using the acts detailed above.

A sample system 100 in which the present technology can be practiced is illustrated in FIG. 1. A web site 10 includes a database 12, a CPU 14, a watermark decoder 16, a fingerprint algorithm 18, a memory 20, and local rules 22. (Not shown are the well known interfaces by which the web site receives uploaded content 24 from users, and dispatches downloaded content 26 to requesting users.)

CPU 14 can comprise one or many processors, as is typical in web server architectures. Memory 20 can comprise a large RAM array in which data and instructions (e.g., operating system, applications software, etc.) are loaded for use by the CPU. Database 12 is an organized data structure in which various data is stored for later retrieval. Examples include audio and video uploaded by users, cached content metadata previously retrieved from other sources, and may include local rules 22. Watermark decoder 16 examines content for steganographically-embedded (digitally watermarked) metadata, such as content identifiers or rights management data. Fingerprint algorithm 18 derives fingerprint data from content, to aid in its identification. (Decoder 16 and algorithm 18 may be implemented in hardware, but are more typically implemented using software loaded into memory 20 and executed on CPU 14.)

Local rules 22 can establish default behaviors of the system in different circumstances. Such rules may provide, for example, that: downloads exceeding 10 minutes should be made only to registered site users; shorter downloads can be made to unregistered users; no content should be downloaded to IP addresses associated with Country X; advertising—sourced from Google based on metadata keywords provided to Google by the site—should be displayed with the content; etc.

The content 24 uploaded from users (e.g., audio, video, games, imagery, etc.) may include metadata. This metadata can be "in-band" (e.g., steganographically embedded in audio or video data), or "out-of-band" (e.g., conveyed in file title, header fields, etc). It may be literally included, or a code or index pointer may be conveyed—by which corresponding metadata from a data repository can be retrieved. As noted, the metadata can include rules by which use of the content should be governed (e.g., a descriptor, such as "by-nc," which indicates that the terms of the Creative Commons "Attribution, Non-Commercial" license apply). The metadata can also include information that is used in applying rules (e.g., the identification of rights-holders, the language of the content, etc.).

(Content 26 downloaded to users can similarly include metadata. This metadata can be of various types, including usage rules, serialization data, credit card of purchaser, etc. In one particular arrangement, the content is steganographically encoded with keywords determined through processes like those detailed herein. For example, a video of a football game may be encoded with the term (or an index that corresponds to the term) "football." Such steganographically-encoded metadata can serve to trigger appropriate responses at the downloader's device, e.g., presenting an advertisement for Jeep products.)

When content 24 is processed (by system 100, or otherwise), the operation often starts by examining the content to identify same. As noted, both watermarking (steganography) and fingerprinting can be employed for this purpose. Watermarking is advantageous in that a watermarked work (or portion thereof) can be identified with a high degree of confidence. Fingerprinting, in contrast, compares characteristics of the content data against a database of reference data to try and make a best-guess as to the content's identity. Desirably, the identification operates with a relatively high degree of granularity (e.g., on the order of seconds for temporal media) to identify all components of which the content may be comprised.

Such identification techniques commonly make use of one or more accessory databases 28, 30 to resolve a watermark or fingerprint identifier (e.g., A75C20) into a more generally useful content identifier. Such content identifier can comprise, e.g., a textual description of the content, a alphanumeric identifier such as ISAN (International Standard Audiovisual Number), etc. In addition to the content identifier, the database 28/30 can also provide other metadata, including language, copyright holder, actor names, terms of use, and applicable rules.

The databases 28, 30 can be general purpose in scope (such as the MusicID database service offered by Gracenote), or may encompass the content catalog of only one or a few companies (e.g., a Hollywood studio may maintain a database relating to its specific offerings). Many television broadcasts are digitally watermarked with metadata identifying the broadcasting station and the time of broadcast, and a corresponding database may be queried by system 100 with these data to learn the identity of the marked content. (See, e.g., Nielsen's U.S. Pat. Nos. 7,117,513 and 6,647,548, and publication US20060171474). System 100 may consult several such databases in an attempt to identify, and collect metadata, about content.

While rule data can be gleaned from the content itself (e.g., via metadata), or determined by reference to the web site's own rules database 22, the system may also consult external sources of rules and related data, such as databases 32a and 32b. For example, a studio may provide a database in which rule information for particular content (e.g., indexed by an ISAN identifier) is stored. This allows the content proprietors to more quickly adapt terms to changing market conditions (e.g., in order to promote an upcoming movie sequel, the studio may temporarily relax rules relating to the original movie).

Also shown in FIG. 1 is a metadata database 34. Again, the depicted database may be one of many. Such databases can comprise, e.g., Flickr, Del.icio.us, CMDS (detailed in application US20070208711), etc., and can again provide both rules, and related data on which rule execution may be based.

The system 100 may also make reference to rules and/or data maintained by a licensing agency 36, such as BMI, ASCAP, Harry Fox. Data source 36 can also comprise a rights server associated with DRM systems, such as Microsoft's Rights Management Services, Windows Media Rights Manager, Windows Media DRM 10, etc. (Applicable rules may require the system 100 to obtain licenses for distribution of certain content.)

Metadata obtained from one data repository (e.g., an ISAN identifier obtained from a database in response to an index decoded from an audio watermark) can be used to query further metadata sources (e.g., a database that lists actors and publication data for a movie in response to an input ISAN query). Data from that second repository, in turn, can be used to find further data in third and additional data repositories—providing a large universe of metadata resources from which the system can draw. (Conversion of format, protocol, classification, and/or other parameters may be required when using the results from one database to query another; such arrangements are detailed, e.g., in publication US20040243567.) The metadata in each of these repositories can includes rule information, which may be aggregated and combined to accurately determine appropriate treatment of the content, in accordance with the various factors in this disclosure.

Once rules applicable to content 24 are determined, the system 100 can store data relating to same in database 12 for later reference—obviating the need to poll all the remote sources repeatedly. (Some rules may be based on information that changes over time; this information will periodically have to be updated.)

In the depicted system 100, the web site serves as a virtual hub—querying remote sources and having resulting information returned to the web site. Naturally, this is not critical. Other architectural arrangements (a few of which are indicated by dashed arrows) can be used—with information being exchanged between remote computers, without the web site always acting as intermediary.

Figure 2:
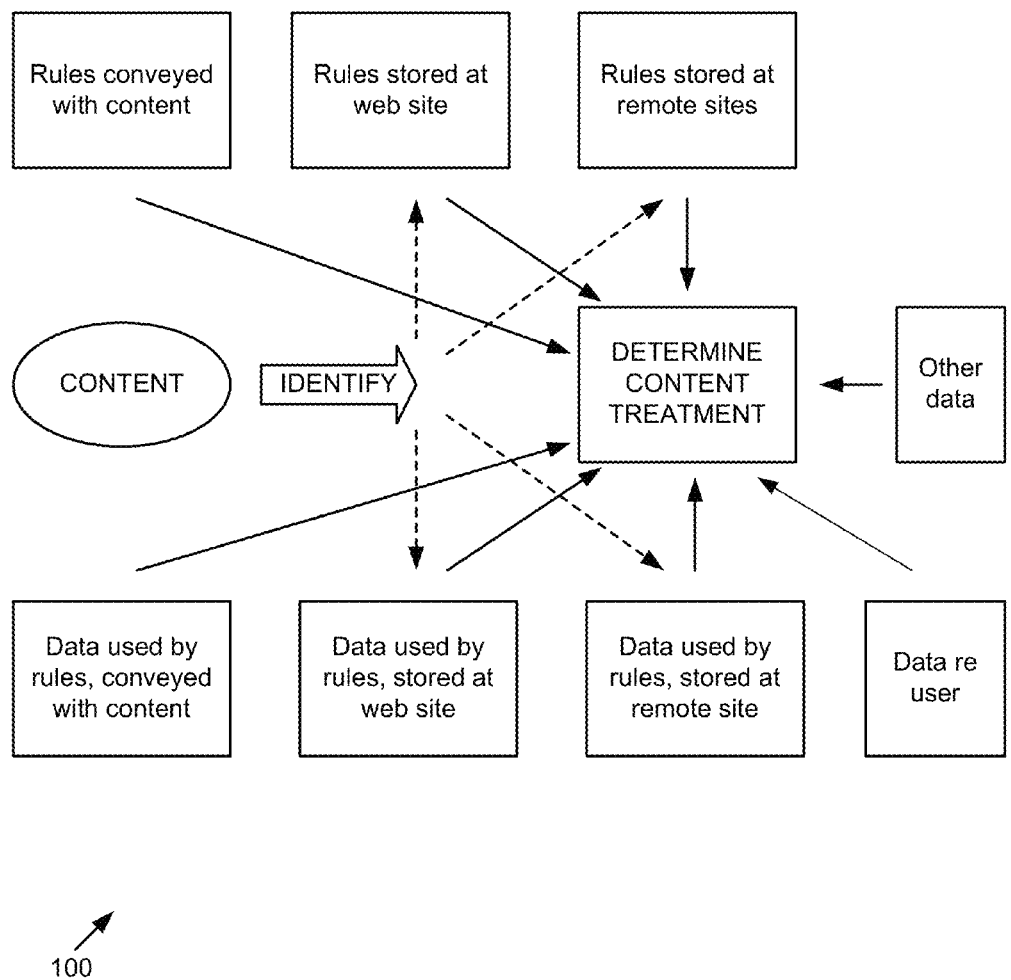
FIG. 2 shows some of the factors that may be considered in determining treatment of content.

FIG. 2 is a conceptual view of one particular implementation, in which content is identified, and corresponding rules and related information are then gathered from a variety of sources and applied in determining how the content should be treated. (The content treatment may also be a function of other data, such as the current date or time, and the identity or geographical location of the user who uploaded or requests download of the content.)

Figure 3:
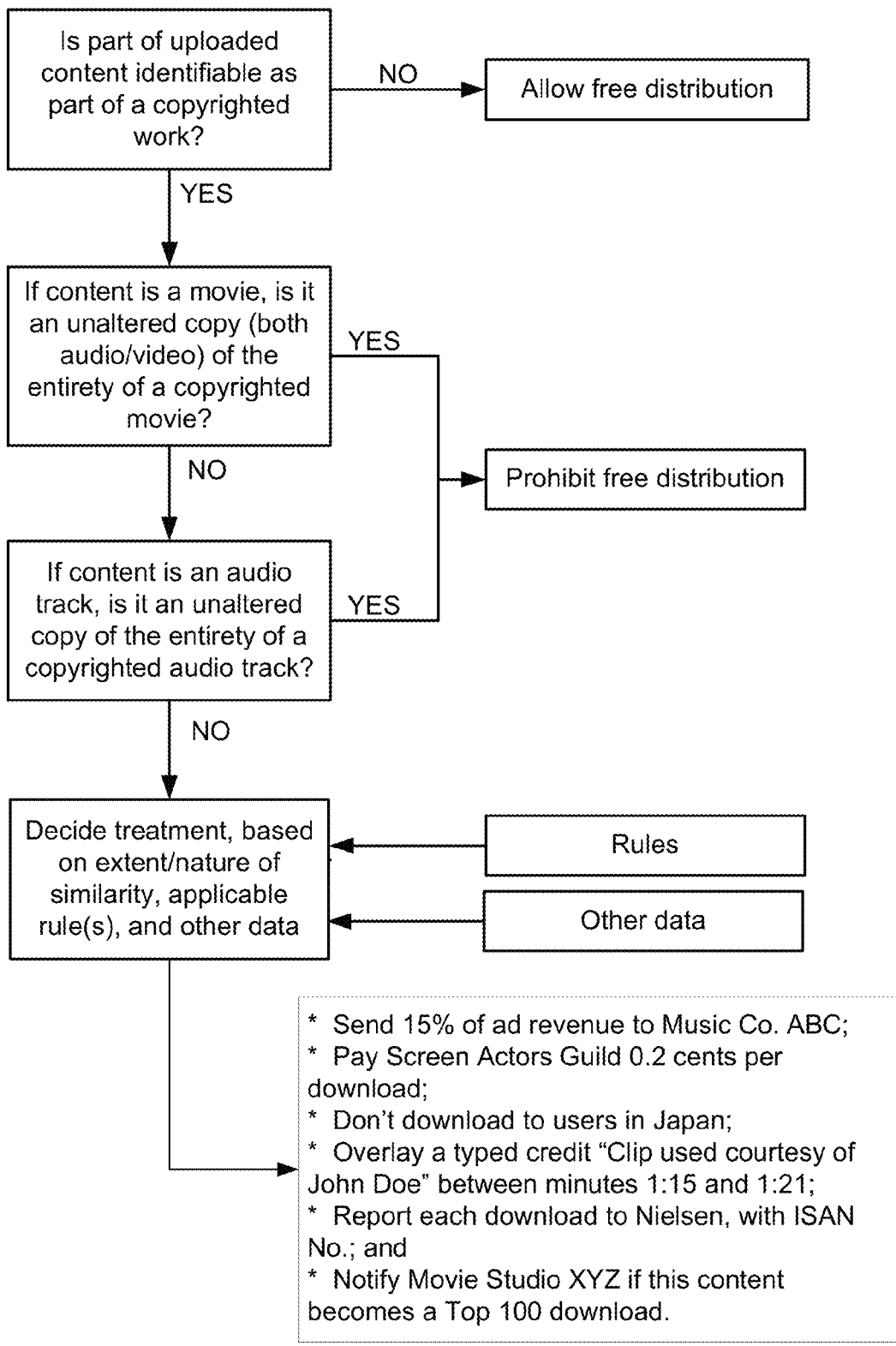
FIG. 3 is a flow diagram for an illustrative process.

FIG. 3 shows a sample process flow. In this arrangement, the content is first examined to determine if any part is identifiable as derived from a copyrighted work (e.g., by fingerprinting or watermark decoding). If no pre-existing work can be identified, then a rule allowing free distribution is invoked. If the content is a movie, and it is found to be an unaltered copy of the entirety of a copyrighted movie (i.e., with complete audio and video tracks), then a rule prohibiting free distribution is invoked. A similar rule is applied if the content is determined to be audio, and it is found to be an unaltered copy of the entirety of a copyrighted audio track. If neither of those conditions is met, the process applies rules that determine appropriate treatment, based on nature and extend of copying, and other data.

Another sample method examines uploaded content having both audio and video tracks. If the audio and video tracks are determined to be unaltered copies of respective audio and video portions of a pre-existing work, then the content is treated in a first manner (e.g., distribution is prohibited; or a fee is charged to downloading users, and 80% of the fee is paid to an associated rights-holder; etc). If the audio is determined to be an unaltered copy of the audio portion of a pre-existing work, but no such determination is made concerning the video, then perhaps the content is a home music video, with a person performing to a commercial music track. In this case the content is treated in a second manner, e.g., referred to a human evaluator to determine if the work might be regarded as a parody, and distribution thus permitted. If the video is determined to be an unaltered copy of the video portion of a pre-existing work, but the audio is different, then it might be a commercially valuable video, dubbed into a foreign language. In such circumstance the content may be treated in a third manner, such as prohibiting distribution, or referred to a human evaluator for assessment.

More on Fingerprint Extraction

Most fingerprint extraction algorithms are based on the following approach. First the audio signal is segmented into frames. For every frame a set of features is computed. Preferably the features are chosen such that they are invariant (at least to a certain degree) to signal degradations. Features that have been proposed are well known audio features such as Fourier coefficients, Mel Frequency Cepstral Coefficients (MFFC), spectral flatness, sharpness, Linear Predictive Coding (LPC) coefficients and others. Also derived quantities such as derivatives, means and variances of audio features are used. Generally the extracted features are mapped into a more compact representation by using classification algorithms, such as Hidden Markov Models, or quantization. The compact representation of a single frame will be referred to as a sub-fingerprint. The global fingerprint procedure converts a stream of audio into a stream of subfingerprints.

One sub-fingerprint usually does not contain sufficient data to identify an audio clip. The basic unit that contains sufficient data to identify an audio clip (and therefore determining the granularity) will be referred to as a fingerprintblock.

Figure 4:
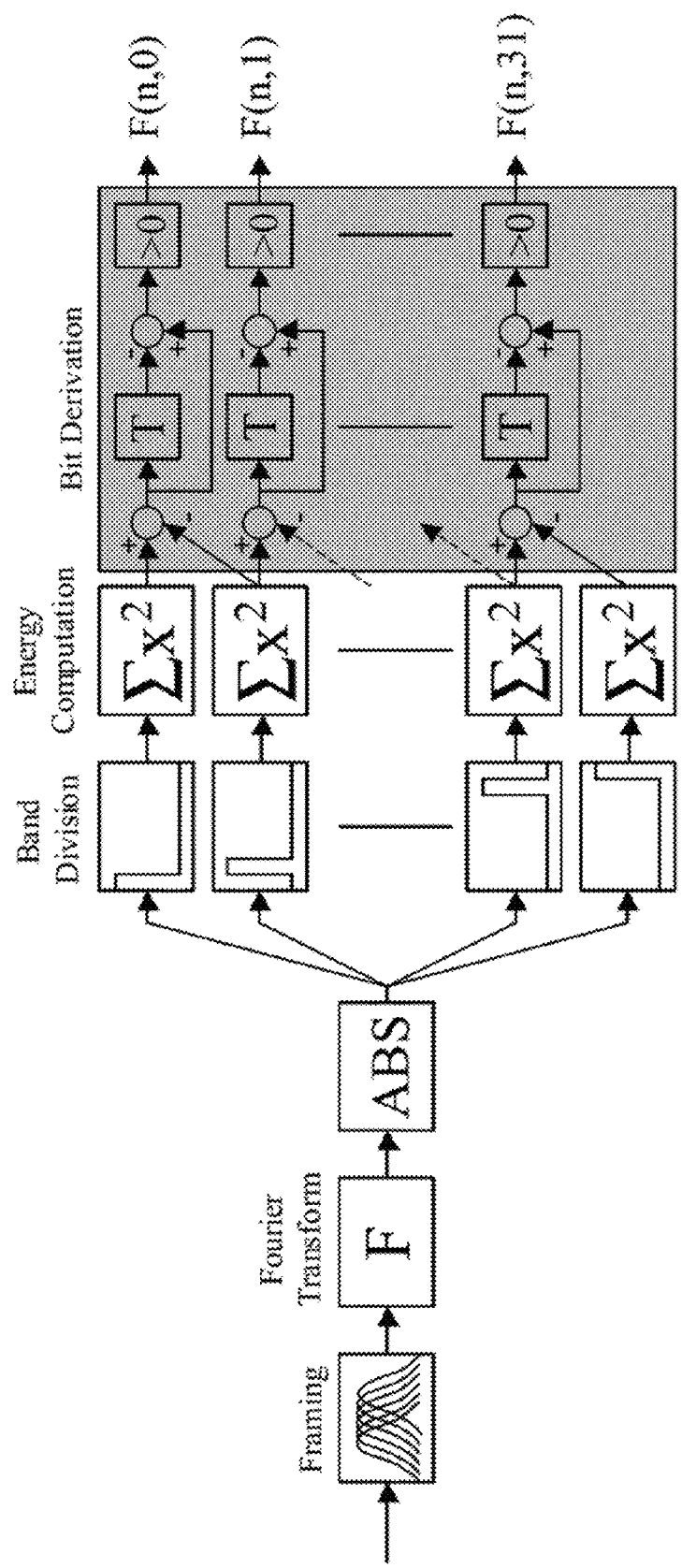
FIG. 4 shows an illustrative process for generating fingerprints.

The proposed fingerprint extraction scheme is based on this general streaming approach. It extracts 32-bit subfingerprints for every interval of 11.6 milliseconds. A fingerprint block consists of 256 subsequent sub-fingerprints, corresponding to a granularity of only 3 seconds. An overview of the scheme is shown in FIG. 4.

The audio signal is first segmented into overlapping frames. The overlapping frames have a length of 0.37 seconds and are weighted by a Hanning window with an overlap factor of 31/32.

This strategy results in the extraction of one sub-fingerprint for every 11.6 milliseconds. In the worst-case scenario the frame boundaries used during identification are 5.8 milliseconds off with respect to the boundaries used in the database of pre-computed fingerprints. The large overlap assures that even in this worst-case scenario the sub-fingerprints of the audio clip to be identified are still very similar to the sub-fingerprints of the same clip in the database. Due to the large overlap subsequent sub-fingerprints have a large similarity and are slowly varying in time.

Figure 5:
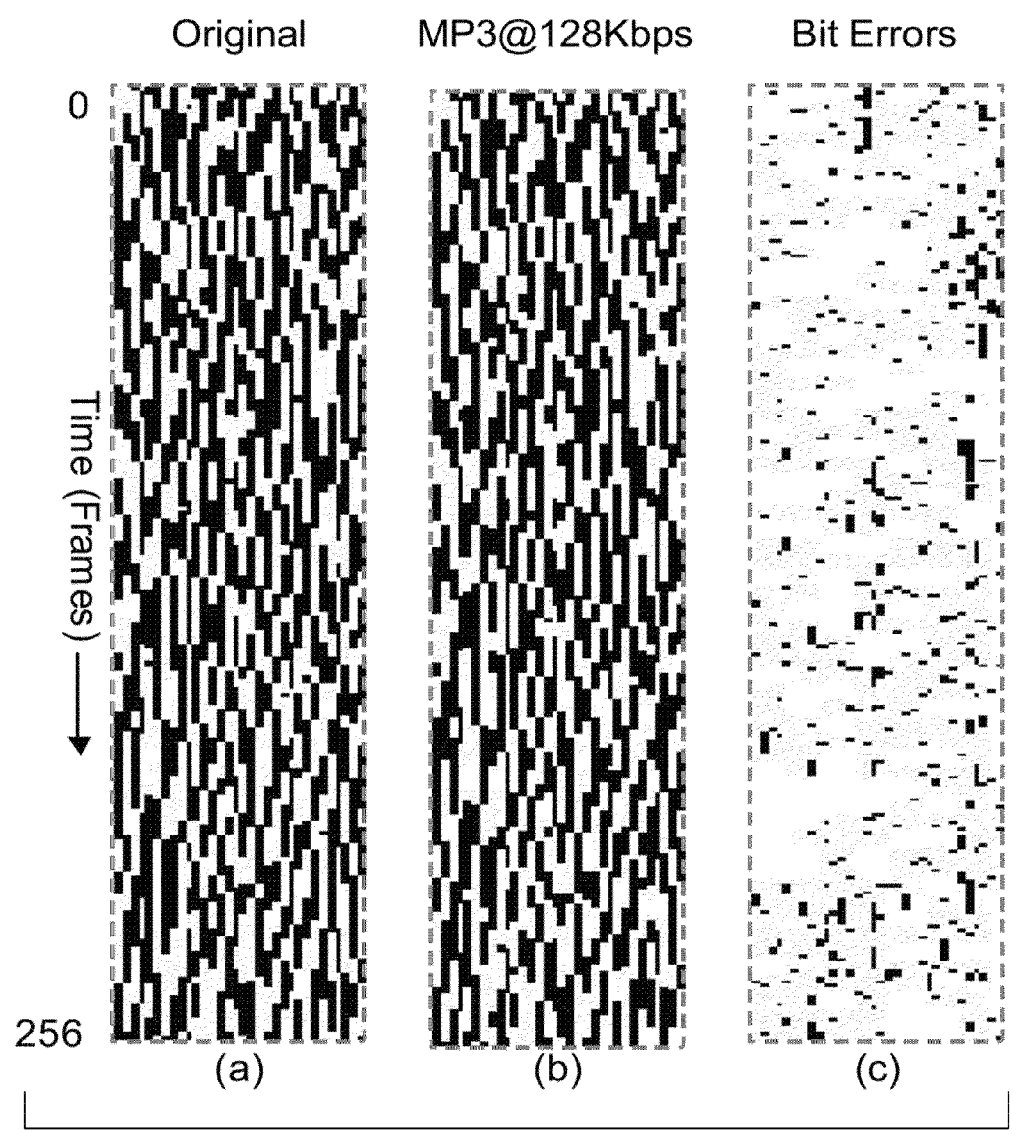
FIG. 5 shows (a) a fingerprint block of original music clip, (b) a fingerprint block of a compressed version, and (c) a difference between a and b, showing bit errors in black.

FIG. 5, at (a), shows an example of an extracted fingerprint block and the slowly varying character along the time axis.

The most important perceptual audio features live in the frequency domain. Therefore a spectral representation is computed by performing a Fourier transform on every frame. Due to the sensitivity of the phase of the Fourier transform to different frame boundaries and the fact that the Human Auditory System (HAS) is relatively insensitive to phase, only the absolute value of the spectrum, i.e. the power spectral density, is retained.

In order to extract a 32-bit sub-fingerprint value for every frame, 33 non-overlapping frequency bands are selected. These bands lie in the range from 300 Hz to 2000 Hz (the most relevant spectral range for the HAS) and have a logarithmic spacing. The logarithmic spacing is chosen, because it is known that the HAS operates on approximately logarithmic bands (the so-called Bark scale). Experimentally it was verified that the sign of energy differences (simultaneously along the time and frequency axes) is a property that is very robust to many kinds of processing. If we denote the energy of band m of frame n by $E(n,m)$ and the mth bit of the sub-fingerprint of frame n by $F(n,m)$, the bits of the subfingerprint are formally defined as (see also the gray block in FIG. 4, where T is a delay element):

$F(n,m)=1$ if $E(n,m)-E(n,m+1)-(E(n-1,m)-E(n-1,m+1))>0$

Else $F(n,m)=0$

FIG. 5 shows an example of 256 subsequent 32-bit subfingerprints (i.e. a fingerprint block), extracted with the above scheme from a short excerpt of 'O Fortuna' by Carl Orff. A '1' bit corresponds to a white pixel and a '0' bit to a black pixel.

FIG. 5, at (a) and (b), show a fingerprint block from an original CD and the MP3 compressed (32 Kbps) version of the same excerpt, respectively. Ideally these two figures should be identical, but due to the compression some of the bits are retrieved incorrectly. These bit errors, which are used as the similarity measure for our fingerprint scheme, are shown in black in FIG. 5, at (c).

The computing resources needed for the proposed algorithm are limited. Since the algorithm only takes into account frequencies below 2 kHz the received audio is first down sampled to a mono audio stream with a sampling rate of 5 kHz. The sub-fingerprints are designed such that they are robust against signal degradations.

Therefore very simple down sample filters can be used without introducing any performance degradation. Currently 16 tap FIR filters are used. The most computationally demanding operation is a Fourier transform of every audio frame. In the down sampled audio signal a frame has a length of 2048 samples. If the Fourier transform is implemented as a fixed point real-valued FFT the fingerprinting algorithm has been shown to run efficiently on portable devices such as a PDA or a mobile phone.

In connection with fingerprinting technology, the term "granularity" is sometimes used. Granularity identifies how many seconds of audio are required to identify an audio clip.

The foregoing discussion was adapted from the above-referenced Haitsma paper, copyright 2002 IRCAM, Centre Pompidou.

Having described and illustrated the principles of the technology with reference to specific implementations, it will be recognized that the technology can be implemented in many other, different, forms.

For example, while the arrangements described above employ fingerprinting or watermark decoding to determine content identity, this is not always needed. In some arrangements, for example, the content identity can be determined (or inferred) by other information, or by circumstance. Consider an uploaded file that includes an identifying ISAN number in a header field, together with a digital signature evidencing that the file has not been altered since being released by the authoring Hollywood studio. Or a file may be retrieved from the site by a remote web crawler or Perl script, in response to title keywords entered in a "Search" dialog box; results that match the entered title keywords may be inferred to include the searched-for content.

In some systems and methods, Bayesian techniques can be advantageously employed in help determine appropriate treatment for content objects and excerpts.

While the detailed arrangements particularly focused on treatment of content ingested by "user generated content" sites such as YouTube, MySpace and Flickr, the same principles are likewise applicable by any other system that receives or processes content (including, without limitation, network routers, firewalls, cell phones, set-top boxes, email servers and gateways, user computers, PDAs, blogging web sites, RSS servers and clients, indexing web crawlers and other web agents, peer-to-peer systems, video games, etc.).

It will be recognized that software instructions for programming a computer or processor in accordance with the teachings herein—as well as related data—can be stored on a computer-readable storage medium.

The rules employed in the detailed arrangements can be structured, stored, distributed, and applied in different ways. In addition to rules specific to particular content items, there may be rules specific to particular content creators, content owners, content hosts (e.g., YouTube vs. MySpace), etc.

Many implementations will make use of Web 2.0 technologies, e.g., employing standardized descriptors (XML and other semantically-valid tags, etc.), Ajax- or Flex-based UIs, folksonomies (collaborative tagging), content syndication, etc.

To provide a comprehensive disclosure without unduly lengthening this specification, applicants incorporate by reference each of the documents mentioned herein (for all of their respective teachings—not just the feature(s) mentioned).

The particular combinations of elements and features in the detailed embodiments are exemplary only; the interchanging, combination, and substitution of these teachings with other teachings in this and the incorporated-by-reference documents are expressly contemplated.

We claim:

1. A method of signal processing that includes processing a received item of audio-visual content to derive both fingerprint and steganographic watermark data, the method comprising the acts:

processing the received item of audio-visual content to derive watermark data therefrom, said watermark data having been previously steganographically encoded in said content;

obtaining metadata for the received item of audio-visual content, based on the derived watermark data;

also processing the received item of audio-visual content to derive fingerprint data therefrom, the derived fingerprint data being different than the derived watermark data;

searching a database of reference fingerprint data for a match with the derived fingerprint data, to thereby determine identity information for a piece of pre-existing audio-visual work included in the received item of audio-visual content;

determining an amount of said piece of pre-existing audio-visual work that is included in the received item of audio-visual content, based on said derived fingerprint data or said derived watermark data, said amount comprising a certain percentage, or a certain duration, of the pre-existing audio-visual work; and governing use of said item of received audio-visual content based on (1) the determined identity information for the pre-existing audio-visual work; (2) the determined amount of the pre-existing audio-visual work that is included in the received item of content; and (3) the obtained metadata;

wherein use of two items of received audio-visual content that appear identical to a human observer, having the same determined identity information and the same determined amount of the pre-existing audio-visual work, are nonetheless governed in two different ways, due to a difference in the obtained metadata for said two items of received content.

2. The method of claim 1 wherein said obtained metadata indicates that a first party was included in a chain of distribution of a first of said two items of received content, and was not included in a chain of distribution of the a second of said two items of received content.

3. The method of claim 1 wherein said first party is different than a party from whom the first item of audio-visual content was received.

4. A non-transitory computer readable medium containing software instructions for configuring a computer system to perform a method that includes processing a received item of audio-visual content to derive both fingerprint and steganographic watermark data, said method comprising the acts:

processing the received item of audio-visual content to derive watermark data therefrom that was previously steganographically encoded in said content;

obtaining metadata for the received item of audio-visual content, based on the derived watermark data;

also processing the received item of audio-visual content to derive fingerprint data therefrom, the derived fingerprint data being different than the derived watermark data;

searching a database of reference fingerprint data for a match with the derived fingerprint data, to thereby determine identity information for a piece of pre-existing audio-visual work included in the received item of audio-visual content;

determining an amount of said piece of pre-existing audio-visual work that is included in the received item of audio-visual content, based on said derived fingerprint data or said derived watermark data, said amount comprising a certain percentage, or a certain duration, of the pre-existing audio-visual work; and governing use of said item of received audio-visual content based on (1) the determined identity information for the pre-existing audio-visual work; (2) the determined amount of the pre-existing audio-visual work that is included in the received item of content; and (3) the obtained metadata;

wherein use of two items of received audio-visual content that appear identical to a human observer, having the same determined identity information and the same determined amount of the pre-existing audio-visual work, are nonetheless governed in two different ways, due to a difference in the obtained metadata for said two items of received content.

5. A computer system for ingesting and re-distributing a received item of audio-visual content, comprising:

watermark decoder means for deriving watermark data from a received item of audio-visual content uploaded by a user, the watermark data having been previously steganographically encoded in said content;

fingerprint derivation means for deriving fingerprint data from said received item of audio-visual content, the derived fingerprint data being different than the derived watermark data;

one or more processors and memory, the memory containing software instructions for configuring the computer system to perform acts including:

obtaining metadata for said received item of audio-visual content, based on the derived watermark data;

searching a database of reference fingerprint data for a match with the derived fingerprint data, to thereby determine identity information for a piece of pre-existing audio-visual work included in the received item of audio-visual content;

determining an amount of said piece of pre-existing audio-visual work that is included in the received item of audio-visual content, based on said derived fingerprint data or said derived watermark data, said amount comprising a certain percentage, or a certain duration, of the pre-existing audio-visual work; and governing use of said received item of audio-visual content based on (1) the determined identity information for the pre-existing audio-visual work; (2) the determined amount of the pre-existing audio-visual work that is included in the received item of audio-visual content; and (3) the obtained metadata;

wherein use of two items of received audio-visual content that appear identical to a human observer, having the same determined identity information and the same determined amount of the pre-existing audio-visual work, are nonetheless governed in two different ways, due to a difference in the obtained metadata for said two items of received content.

* * * * *